United States Patent
Hiraoka et al.

(10) Patent No.: US 11,286,535 B2
(45) Date of Patent: Mar. 29, 2022

(54) HEAT TREATMENT EQUIPMENT AND HEAT TREATMENT METHOD

(71) Applicant: NTN CORPORATION, Osaka (JP)

(72) Inventors: Tsuneaki Hiraoka, Shizuoka (JP); Yuuki Tabuchi, Shizuoka (JP); Shintaro Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 393 days.

(21) Appl. No.: 16/312,388

(22) PCT Filed: May 26, 2017

(86) PCT No.: PCT/JP2017/019814
§ 371 (c)(1),
(2) Date: Dec. 21, 2018

(87) PCT Pub. No.: WO2017/221636
PCT Pub. Date: Dec. 28, 2017

(65) Prior Publication Data
US 2019/0233911 A1    Aug. 1, 2019

(30) Foreign Application Priority Data
Jun. 24, 2016 (JP) .............................. JP2016-125717

(51) Int. Cl.
*H05B 6/36* (2006.01)
*C21D 9/00* (2006.01)
(Continued)

(52) U.S. Cl.
CPC ............. *C21D 9/0062* (2013.01); *C21D 1/10* (2013.01); *C21D 1/42* (2013.01); *C21D 9/00* (2013.01);
(Continued)

(58) Field of Classification Search
CPC ... H05B 6/02; H05B 6/04; H05B 6/06; H05B 6/08; H05B 6/34; H05B 6/36; H05B 6/40;
(Continued)

(56) References Cited

U.S. PATENT DOCUMENTS

| | | | |
|---|---|---|---|
| 6,177,662 B1* | 1/2001 | Rutledge | H05B 6/107 219/652 |
| 2009/0139832 A1* | 6/2009 | Sato | B65G 33/06 198/358 |
| 2016/0230243 A1 | 8/2016 | Hiraoka et al. | |

FOREIGN PATENT DOCUMENTS

| | | |
|---|---|---|
| CN | 105593384 | 5/2016 |
| DE | 198 27 608 | 2/2000 |

(Continued)

OTHER PUBLICATIONS

International Preliminary Report on Patentability and Written Opinion of the International Searching Authority dated Aug. 29, 2017 in International (PCT) Application No. PCT/JP2017/019814.
(Continued)

*Primary Examiner* — Hung D Nguyen
(74) *Attorney, Agent, or Firm* — Wenderoth, Lind & Ponack, L.L.P.

(57) ABSTRACT

Provided is a heat treatment apparatus (1), including: a conveying device (10), which is configured to convey a rod-shaped workpiece (W) at a predetermined velocity along an axial direction of the workpiece (W); and a heating device (2) including a heating coil (3) configured to inductively heat the workpiece (W) being conveyed to a quenching temperature, wherein the heating coil (3) includes a first heating section (3A) and a second heating section (3B), which are coupled to each other in series along the axial direction of the workpiece (W), and is electrically connected to a single high-frequency power supply (4), and wherein a
(Continued)

coil pitch (D2) of the second heating section (3B) arranged relatively on a front side in a conveying direction for the workpiece (W) is larger than a coil pitch (D1) of the first heating section (3A) arranged relatively on a rear side in the conveying direction.

8 Claims, 9 Drawing Sheets

(51) Int. Cl.
*C21D 9/36* (2006.01)
*C21D 1/10* (2006.01)
*C21D 1/42* (2006.01)
*H05B 6/06* (2006.01)
*H05B 6/10* (2006.01)

(52) U.S. Cl.
CPC .................. *C21D 9/36* (2013.01); *H05B 6/06* (2013.01); *H05B 6/36* (2013.01); *Y02P 10/25* (2015.11)

(58) Field of Classification Search
CPC ... H05B 6/42; H05B 6/44; C21D 9/00; C21D 9/0056; C21D 9/0062; C21D 9/0068; C21D 9/0075; C21D 9/0093; C21D 9/08; C21D 9/085; C21D 9/36; C21D 1/10; C21D 1/40; C21D 1/42; Y02P 10/25; Y02P 10/253

USPC ....... 219/635, 639, 642, 643, 646, 652, 653, 219/654–656, 672, 674, 662, 671
See application file for complete search history.

(56) References Cited

FOREIGN PATENT DOCUMENTS

| JP | 07-3325 | 1/1995 |
| JP | 2002-367762 | 12/2002 |
| JP | 2003-336971 | 11/2003 |
| JP | 2005-331005 | 12/2005 |
| JP | 2012-38473 | 2/2012 |

OTHER PUBLICATIONS

Extended European Search Report dated Nov. 6, 2019 in corresponding European Patent Application No. 17815105.6.
International Search Report dated Aug. 29, 2017 in International (PCT) Application No. PCT/JP2017/019814.
Chinese Office Action dated Mar. 20, 2020 in corresponding Chinese Patent Application No. 201780038093.9 with English translation of Search Report.
Chinese Office Action dated Mar. 1, 2021 in corresponding Chinese Patent Application No. 201780038093.9 with English translation of the Search Report.

* cited by examiner

HEAT TREATMENT EQUIPMENT AND HEAT TREATMENT METHOD

TECHNICAL FIELD

The present invention relates to a heat treatment apparatus and a heat treatment method, and more particularly, to a heat treatment apparatus and a heat treatment method, which can be suitably used when a heat treatment (quench hardening) is performed on a rod-shaped workpiece, which has an outer peripheral surface with a circular cross section and is to be produced in a large lot.

BACKGROUND ART

A heat treatment (quench hardening) is performed on a mechanical component such as a cylindrical roller or a tapered roller, which requires a high mechanical strength and a high hardness, in a manufacturing process thereof. The heat treatment includes, for example, a heating step of heating a rod-shaped workpiece having an outer peripheral surface with a circular cross section to a predetermined temperature (quenching temperature) and a cooling step of cooling the heated rod-shaped workpiece. The above-mentioned heating step can be carried out using an atmosphere heating furnace such as a mesh-belt type continuous furnace, or an induction heating apparatus including, for example, a high-frequency power supply, a heating coil, and a conveying device configured to move the rod-shaped workpiece relative to the heating coil (for example, Patent Literature 1).

CITATION LIST

Patent Literature 1: JP 2005-331005 A

SUMMARY OF INVENTION

Technical Problem

The rod-shaped workpiece described above is formed of, for example, a steel material containing carbon at 0.8% by mass or more (for example, SUJ2, which is a kind of high-carbon chromium bearing steel specified in JIS G4805). In this case, it is preferred that the heating step be carried out so that carbon at about 0.6% by mass is dissolved in a metallic structure (austenite) of the workpiece and a residual thereof remains as a carbide. The main reason thereof is as follows. When the amount of dissolution of carbon is set to about 0.6% by mass, the amount of generation of residual austenite, which may cause a problem such as decrease in hardness or aging degradation, can be reduced. Further, when the carbide is caused to remain, growth of crystal grains of austenite during heating can be prevented. In order to control the amount of dissolution of carbon into the workpiece, as shown in FIG. 12, it is effective to heat the workpiece until a temperature of the workpiece reaches a predetermined temperature (quenching temperature) T and then heat the workpiece for a predetermined time period so that the workpiece is maintained at the quenching temperature T (soak the workpiece for the predetermined time period).

In a case in which the atmosphere heating furnace is used, when an in-furnace temperature and a heat-treatment time period (t1+t2) are adjusted, the workpiece can be heated so that a temperature path shown in FIG. 12 is obtained. In the atmosphere heating furnace, however, a large amount of energy and long time are required to increase the in-furnace temperature to the quenching temperature T. Therefore, there is a disadvantage in terms of cost. Meanwhile, in a case in which the induction heating apparatus is used, only the workpiece can be directly heated, and hence high energy efficiency can be achieved correspondingly. Therefore, the heat-treatment time period (t1+t2), which is remarkably shorter than that in the case in which the atmosphere heating furnace is used, is only required. In the induction heating, however, it is difficult to control a temperature of the workpiece. In particular, a technical measure for soaking the workpiece is required to be examined.

A so-called mass-produced item such as the cylindrical roller is desired to be manufacturable with efficiency as high as possible. In view of this fact, the inventors of the present invention have examined induction heating of the rod-shaped workpiece while the rod-shaped workpiece is being continuously conveyed at a predetermined velocity along an axial direction of the rod-shaped workpiece. Also in this case, the technical measure for soaking the rod-shaped workpiece is required to be examined.

Further, it is desired that the heating apparatus configured to inductively heating the rod-shaped workpiece and a heat treatment apparatus including the heating apparatus be as simple as possible and as low in cost as possible.

In view of the actual circumstances described above, the present invention has an object to provide a heat treatment apparatus having a relatively simple configuration, which is capable of inductively heating a rod-shaped workpiece to be subjected to a heat treatment with high efficiency so that a predetermined temperature path is obtained and, consequently, to enable mass production of high-quality mechanical components having a desired mechanical strength and a desired hardness at low cost.

Solution to Problem

According to one embodiment of the present invention, which has been devised to achieve the above-mentioned object, there is provided a heat treatment apparatus, comprising: a conveying device, which is configured to convey a rod-shaped workpiece having an outer peripheral surface with a circular cross section at a predetermined velocity along an axial direction of the rod-shaped workpiece; and a heating device comprising a heating coil configured to inductively heat the rod-shaped workpiece being conveyed to a quenching temperature, wherein the heating coil comprises a first heating section and a second heating section, which are coupled to each other in series along the axial direction of the rod-shaped workpiece, and is electrically connected to a single high-frequency power supply, and wherein a coil pitch of the second heating section arranged relatively on a front side in a conveying direction for the rod-shaped workpiece is larger than a coil pitch of the first heating section arranged relatively on a rear side in the conveying direction for the rod-shaped workpiece. The term "rod-shaped workpiece" in the present invention encompasses both a solid rod-shaped workpiece (for example, a columnar workpiece) and a hollow rod-shaped workpiece (for example, a cylindrical workpiece). Further, the term "axial direction" corresponds to an axial direction of the rod-shaped workpiece.

The heating coil configured to inductively heat the workpiece has such characteristics that an output is increased as a coil pitch becomes smaller and the output is decreased as the coil pitch becomes larger. Therefore, when the heating coil comprises the first heating section and the second heating section, which are coupled to each other in series along the axial direction of the rod-shaped workpiece, and the coil pitch of the second heating section arranged relatively on the front side in the conveying direction for the rod-shaped workpiece is set larger than the coil pitch of the first heating section arranged relatively on the rear side in the conveying direction for the rod-shaped workpiece, the temperature of the rod-shaped workpiece can be actively increased while the rod-shaped workpiece is being conveyed through a region opposed to the first heating section. Meanwhile, the rod-shaped workpiece can be maintained at a predetermined temperature (quenching temperature) while the rod-shaped workpiece is being conveyed through a region opposed to the second heating section. Therefore, the rod-shaped workpiece can be inductively heated so that the rod-shaped workpiece has the desired temperature path (temperature path shown in FIG. 12).

Further, the first heating section and the second heating section are coupled to each other in series. Therefore, even when there is adopted a simple configuration in which the single high-frequency power supply is electrically connected to the heating coil, the rod-shaped workpiece can be inductively heated in the above-mentioned mode.

When an axial dimension of the second heating section is larger than an axial dimension of the first heating section, it becomes easier to set conditions for appropriately soaking the rod-shaped workpiece being conveyed.

The first heating section and the second heating section may be separably coupled to each other. In this manner, for example, even when there arises the need of adjustment of any one or both of the coil pitches of the heating sections, the coil pitch adjustment can be achieved by replacing the coil.

There may be adopted the conveying device comprising: a first shaft member and a second shaft member, which are apart from each other and extend in parallel in the axial direction, and are configured to support the outer peripheral surface of the rod-shaped workpiece in a contact state in cooperation with each other; and a rotary mechanism configured to rotate the first shaft member about an axis thereof and the second shaft member about an axis thereof in the same direction, wherein at least one of the first shaft member and the second shaft member comprises a helical protruding portion extending along an outer periphery thereof, and the outer peripheral surface of the rod-shaped workpiece is held in contact with a groove bottom surface of a helical groove defined by the protruding portion.

With the conveying device described above, the rod-shaped workpiece can be conveyed while being rotated about an axis thereof. In this manner, occurrence of a temperature difference between portions in a circumferential direction, the axial direction, and a radial direction of the rod-shaped workpiece (occurrence of temperature unevenness in the rod-shaped workpiece) can be prevented as much as possible. Therefore, the rod-shaped workpiece can be appropriately provided with the desired mechanical strength and the desired hardness.

The above-mentioned conveying device can be configured so as to be capable of conveying a plurality of rod-shaped workpieces under a state in which the plurality of rod-shaped workpieces are apart from each other in the axial direction. In this case, the heat treatment can be efficiently performed on the plurality of rod-shaped workpieces. Besides, each of the rod-shaped workpieces can be heated with high accuracy without being thermally affected by an adjacent one of the rod-shaped workpieces.

It is desired that any one of the first shaft member and the second shaft member be formed of a threaded shaft having the above-mentioned protruding portion and another one thereof be formed of a columnar shaft having a constant diameter. In this manner, complication and increase in cost of the conveying device can be prevented.

The heat treatment apparatus according to one embodiment of the present invention may further comprise a cooling device, which is configured to cool the rod-shaped workpiece heated to the quenching temperature by the heating device. In this manner, the rod-shaped workpiece can be appropriately quench-hardened.

The heat treatment apparatus according to one embodiment of the present invention can be suitably used when the heat treatment is performed on the rod-shaped workpiece made of a steel material containing carbon at 0.8% by mass or more (for example, high carbon steel or alloy steel). As the rod-shaped workpiece, there is exemplified a roller for a roller bearing. The term "roller bearing" herein encompasses, for example, a cylindrical roller bearing, a tapered roller bearing, and a needle roller bearing. Therefore, the term "roller" encompasses, for example, a cylindrical roller, a tapered roller, and a needle roller.

According to one embodiment of the present invention, which has been devised to achieve the above-mentioned object, a heat treatment method comprises a heating step of inductively heating a rod-shaped workpiece having an outer peripheral surface with a circular cross section to a quenching temperature by causing the rod-shaped workpiece to pass through a region opposed to a heating coil in an energized state while conveying the rod-shaped workpiece at a predetermined velocity along an axial direction of the rod-shaped workpiece, wherein the heating step includes use of the heating coil, which is electrically connected to a single high-frequency power supply, the heating coil comprising a first heating section and a second heating section, which are coupled to each other in series along the axial direction of the rod-shaped workpiece, in which a coil pitch of the second heating section arranged relatively on a front side in a conveying direction for the rod-shaped workpiece is larger than a coil pitch of the first heating section arranged relatively on a rear side in the conveying direction for the rod-shaped workpiece.

It is preferred that, in the heating step, the rod-shaped workpiece be conveyed while being rotated about an axis of the rod-shaped workpiece. Further, in the heating step, a plurality of the rod-shaped workpieces may be conveyed under a state in which the plurality of rod-shaped workpieces are separated from each other in the axial direction of the rod-shaped workpiece.

Advantageous Effects of Invention

As described above, according to one embodiment of the present invention, the rod-shaped workpiece to be subjected to the heat treatment can be inductively heated in an efficient manner with the relatively simple configuration so that the desired temperature path is obtained. In this manner, the high-quality mechanical components having the desired mechanical strength can be mass-produced at low cost.

BRIEF DESCRIPTION OF DRAWINGS

FIG. 10 is seen in the direction indicated by the arrow G of FIG. 10.

DESCRIPTION OF EMBODIMENTS

Now, description is made of embodiments of the present invention with reference to the drawings.

Figure 1:
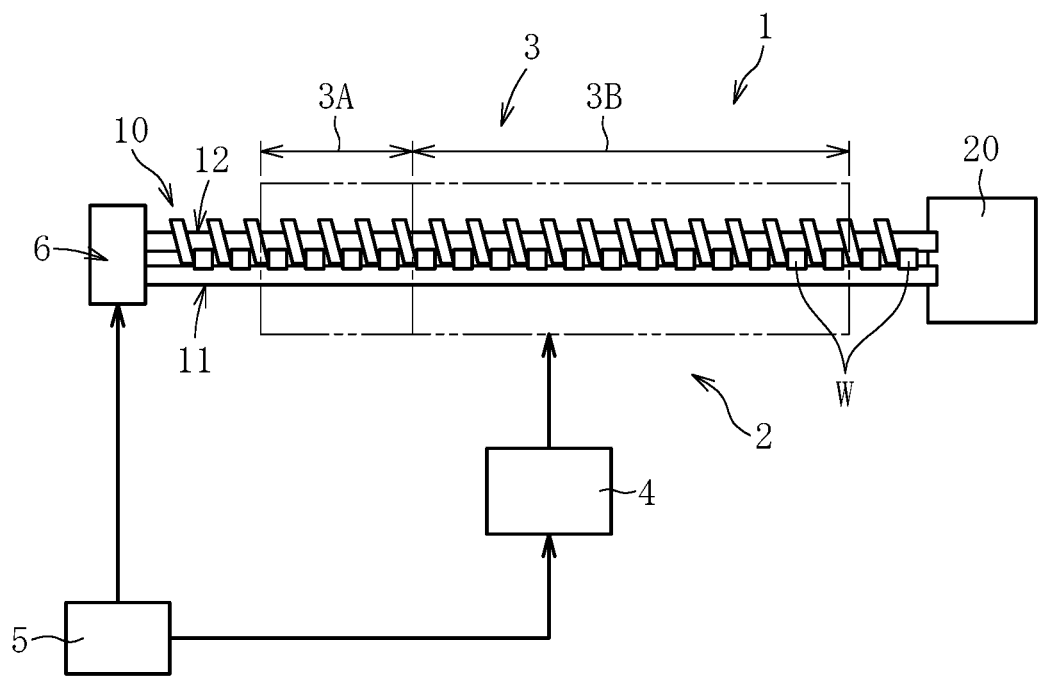
FIG. 1 is a plan view for schematically illustrating an overall structure of a heat treatment apparatus according to one embodiment of the present invention.

FIG. 1 is a plan view for schematically illustrating an overall structure of a heat treatment apparatus 1 according to an embodiment of the present invention. The heat treatment apparatus 1 illustrated in FIG. 1 is configured to perform quench hardening on a rod-shaped workpiece W made of steel, more specifically, for example, a solid rod-shaped workpiece (a base material for a tapered roller in this embodiment) W, which is made of a steel material containing carbon at 0.8% by mass or more (for example, SUJ2 or SUJ3, which is classified as high-carbon chromium bearing steel specified in JIS G4805) and has an outer peripheral surface with a circular cross section. The heat treatment apparatus 1 is configured to sequentially perform a heating step of inductively heating the rod-shaped workpiece W to a predetermined temperature (quenching temperature) and a cooling step of cooling the rod-shaped workpiece W heated to the quenching temperature.

As illustrated in FIG. 1, the heat treatment apparatus 1 comprises a conveying device 10, a heating device 2, and a cooling section 20. The conveying device 10 is configured to continuously convey the rod-shaped workpieces W in a horizontal posture (laterally oriented posture) at a predetermined velocity (constant velocity) along an axial direction of the rod-shaped workpieces W. The heating device 2 is configured to inductively heat the rod-shaped workpieces W being conveyed to the quenching temperature. The cooling section 20 serving as a cooing device is configured to cool the rod-shaped workpieces W discharged from the heating device 2. The cooling section 20 comprises, for example, a cooling liquid bath in which a cooling liquid such as quenching oil is stored.

The heating device 2 comprises a heating coil 3 and a single high-frequency power supply 4. The heating coil 3 is supported on a frame body 9 (see FIG. 3 and FIG. 4). The single high-frequency power supply 4 is configured to supply high-frequency power to the heating coil 3. The heating coil 3 comprises a first heating section 3A and a second heating section 3B, which are coupled to each other in series along an axial direction (axial direction of the rod-shaped workpiece W, and the same applies to the following). The heating sections 3A and 3B are coupled to each other in series by, for example, welding. The high-frequency power supply 4 is electrically connected to a controller 5 and supplies a predetermined amount of high-frequency power to the heating coil 3 based on a signal output from the controller 5.

Figure 2:
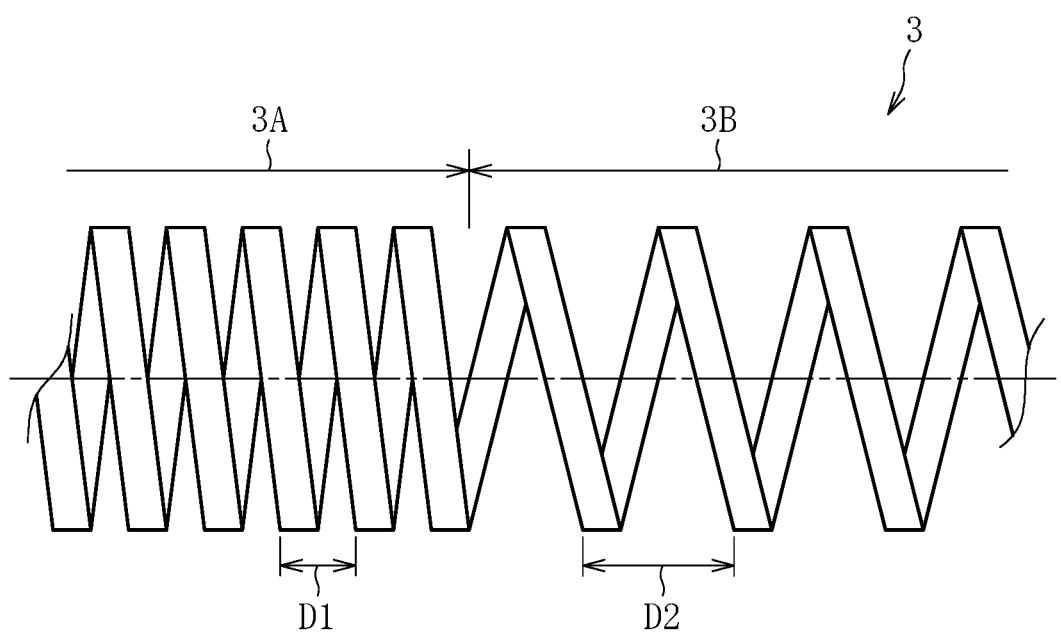
FIG. 2 is a partially enlarged schematic view of a heating coil.

As schematically illustrated in FIG. 2, the heating coil 3 comprising the first heating section 3A and the second heating section 3B is formed of a so-called helical coil formed by a helically wound tubular body (for example, a copper pipe) made of a conductive metal. A coil pitch D1 of the first heating section 3A is set smaller than a coil pitch D2 of the second heating section 3B. As illustrated in FIG. 1, an axial dimension of the first heating section 3A and an axial dimension of the second heating section 3B are both sufficiently longer than an axial dimension of the rod-shaped workpiece W.

Although not specifically illustrated, the heating device 2 may comprise a cooling circuit configured to cool the heating coil 3. When such cooling circuit described above is provided, a temperature of the heating coil 3 can be appropriately and efficiently controlled. Thus, the rod-shaped workpiece W can be inductively heated to a predetermined temperature in an accurate and efficient manner.

The conveying device 10 is configured to continuously convey the rod-shaped workpiece W at a predetermined velocity (constant velocity) in the axial direction while rotating the rod-shaped workpiece W about an axis thereof. The conveying device 10 described above comprises, as illustrated in FIG. 3 and FIG. 5A, a first shaft member 11, a second shaft member 12, and a rotary mechanism 6. The first shaft member 11 and the second shaft member 12 are apart from each other and extend in parallel in the axial direction, and are configured to support the outer peripheral surfaces of the rod-shaped workpieces W from a lower side in a contact state in cooperation with each other. The rotary mechanism 6 is configured to rotate both the shaft members 11 and 12 about axes thereof. As illustrated in FIG. 5B, the shaft members 11 and 12 are disposed so that the axes (centers of rotation) of the two shaft members are positioned on the same plane. As illustrated in FIG. 1, each of the shaft members 11 and 12 is longer than the heating coil 3, and has one axial end and another axial end, which project outward from the heating coil 3.

Figure 4:
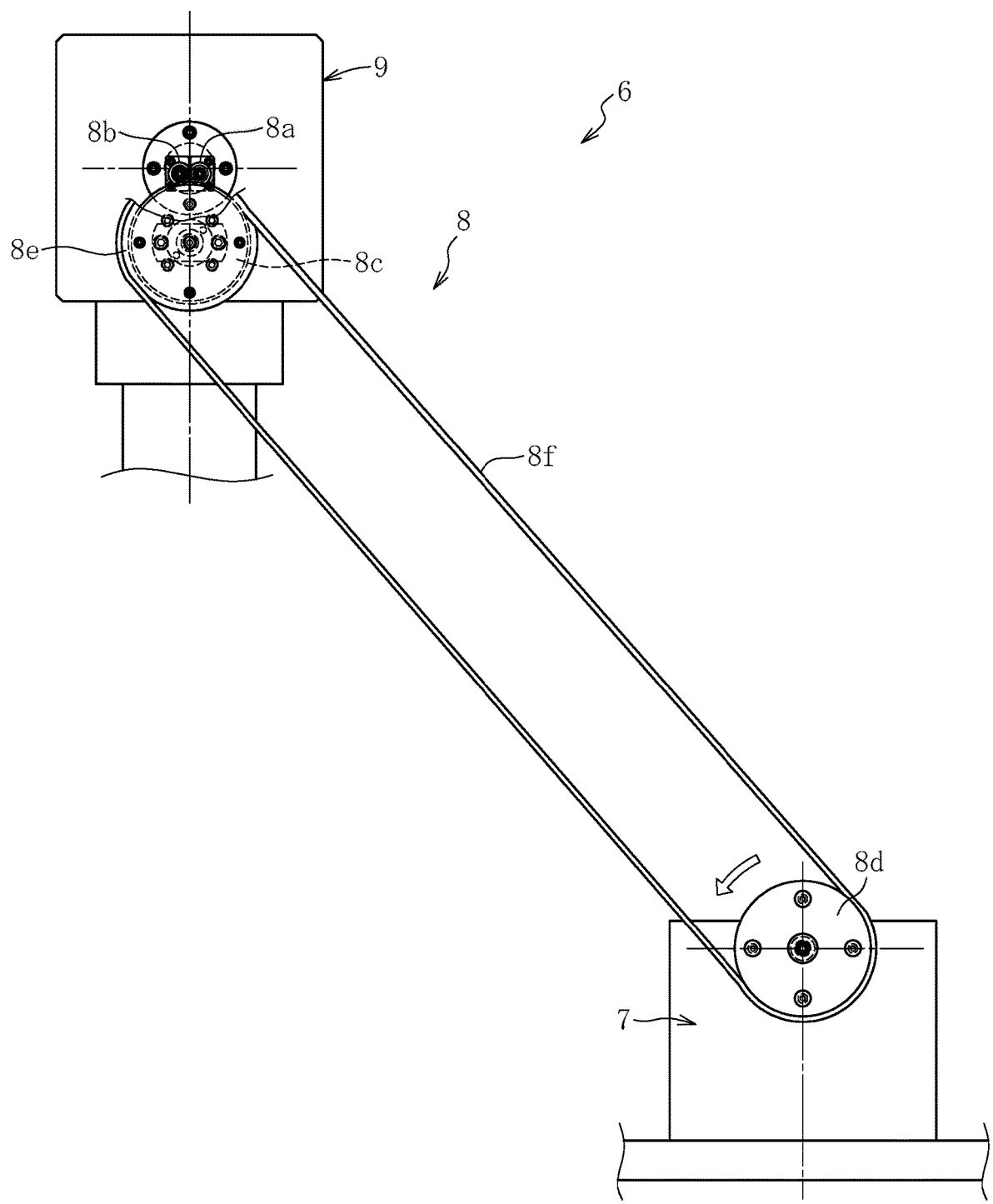
FIG. 4 is a schematic front view of the conveying device.

As illustrated in FIG. 4, the rotary mechanism 6 comprises an electric motor 7 such as a servomotor and a power transmission mechanism 8. The power transmission mechanism 8 is configured to transmit rotary power of the electric motor 7 to both of the shaft members 11 and 12. The electric motor 7 is electrically connected to a power supply (not shown) and is driven to rotate at a predetermined rotation velocity based on the signal output from the controller. In this embodiment, as illustrated in FIG. 1, the controller 5, which outputs the control signal to the high-frequency power supply 4, is configured to output the control signal also to the electric motor 7 of the rotary mechanism 6. However, a controller configured to output the control signal to the electric motor 7 can also be provided independently of the controller 5.

Figure 3:
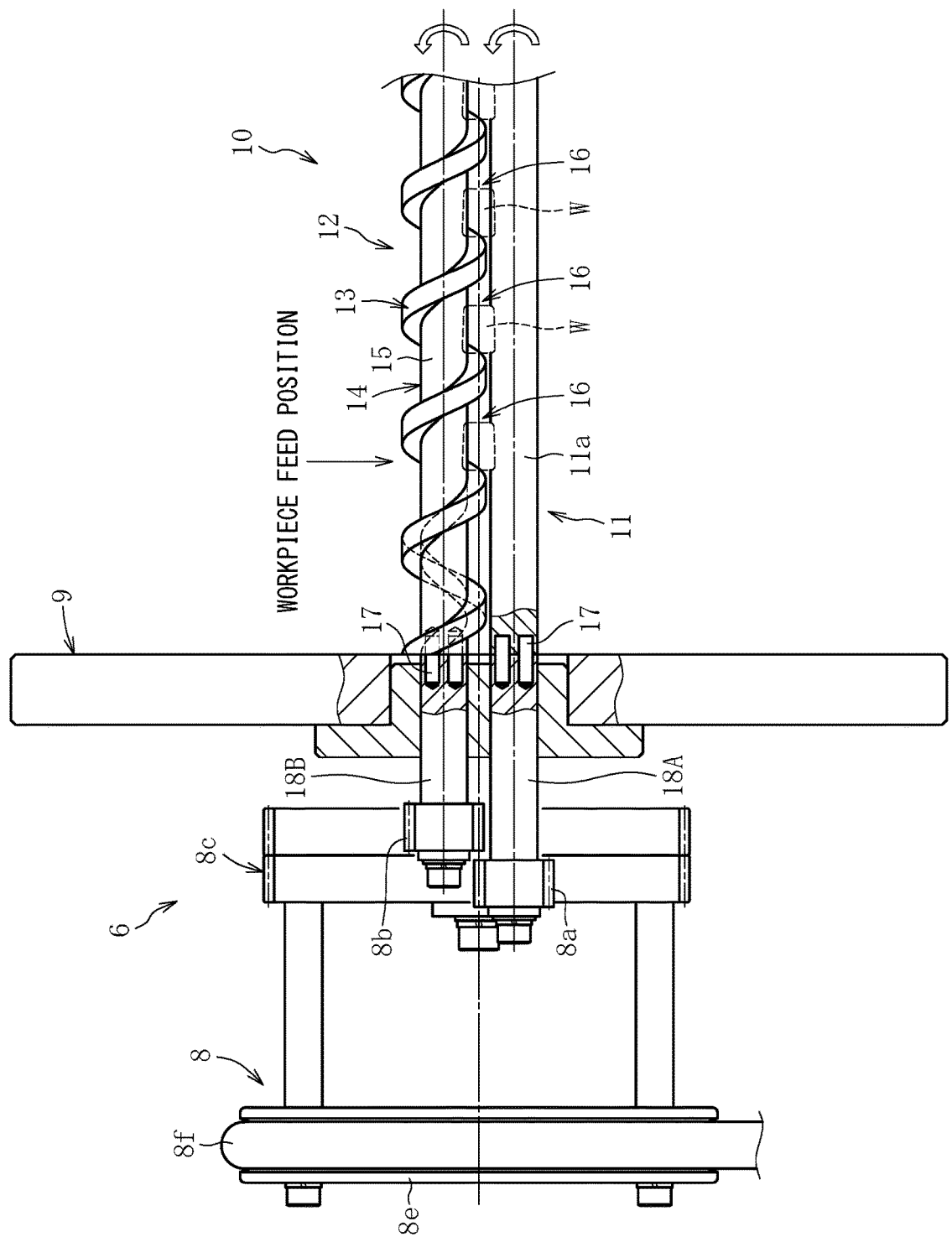
FIG. 3 is a partially enlarged plan view of a conveying device.
Figure 5A:
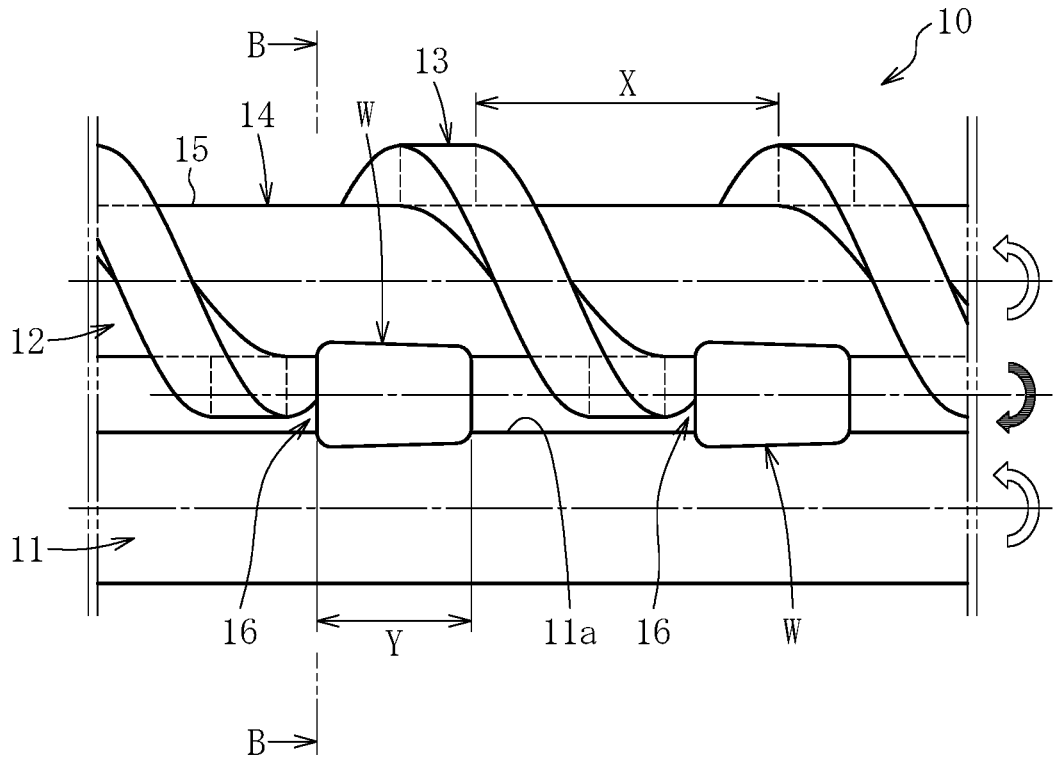
FIG. 5A is an enlarged plan view of a main part of the conveying device.
Figure 5B:
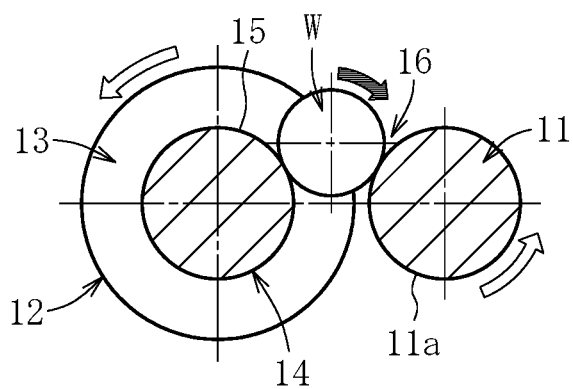
FIG. 5B is a schematic sectional view taken along the line B-B of FIG. 5A as seen in the direction indicated by the arrows.

As illustrated in FIG. 3, FIG. 5A, and FIG. 5B, the first shaft member 11 is formed of a solid columnar shaft having an outer peripheral surface 11a formed as a cylindrical surface having a constant diameter, whereas the second shaft member 12 is formed of a solid threaded shaft having a helical protruding portion 13 extending along an outer periphery thereof. Both of the shaft members 11 and 12 are made of a non-magnetic material. As the non-magnetic material, ceramic (for example, alumina, zirconia, or silicon carbide) having a high hardness and an excellent heat resistance can be suitably used.

The outer peripheral surfaces of the rod-shaped workpieces W are supported by workpiece support portions 16 in a contact state. The workpiece support portions 16 are formed by cooperation between a groove bottom surface 15 of a helical groove 14 defined by the helical protruding portion 13 on the outer periphery of the second shaft member 12 and the outer peripheral surface 11a of the first shaft member 11, which faces the groove bottom surface 15. In particular, when a groove width of the helical groove 14 (axial dimension of the groove bottom surface 15) is X, and an axial dimension of the rod-shaped workpiece W is Y, a pitch and a width dimension of the protruding portion 13 are set so as to satisfy a relational expression of Y<X. As described above, the conveying device 10 comprises the workpiece support portions 16 capable of supporting the outer peripheral surfaces of the rod-shaped workpieces W from the lower side in a contact state, which are formed at a plurality of positions separated from each other in the axial direction. When, for example, the relational expression of X<2Y is satisfied, only the single rod-shaped workpiece W is supported in each of the workpiece support portions 16 in a contact state. Therefore, a plurality of the rod-shaped workpieces W can be conveyed under a state in which the rod-shaped workpieces W are reliably separated from each other in the axial direction.

As illustrated in FIG. 3 and FIG. 4, the power transmission mechanism 8 comprises a gear shaft 18A, a gear shaft 18B, a large gear 8c, a drive pulley 8d, a driven pulley 8e, and an endless belt member 8f. The gear shaft 18A has a small gear 8a and is coupled to one axial end of the first shaft member 11 through intermediation of coupling pins 17. The gear shaft 18B has a small gear 8b and is coupled to one axial end of the second shaft member 12 through intermediation of the coupling pins 17. The large gear 8c is supported on the frame body 9 so as to be freely rotatable and meshes with both of the small gears 8a and 8b. The drive pulley 8d is coupled to an output shaft of the electric motor 7. The driven pulley 8e is coupled to the large gear 8c. The endless belt member 8f, which may also be a chain, is looped over outer peripheral surfaces of the pulleys 8d and 8e. A tooth flank pitch of the small gear 8a and a tooth flank pitch of the small gear 8b are the same. Further, a tooth flank pitch of part of the large gear 8c, which meshes with the small gear 8a, and a tooth flank pitch of part of the large gear 8c, which meshes with the small gear 8b, are the same. When the electric motor 7 is driven by the power transmission mechanism 8 having the configuration described above, the first shaft member 11 and the second shaft member 12 are rotated at the same velocity in the same direction.

When the heat treatment apparatus 1 having the configuration described above is used, the quench hardening, which include the heating step and the cooling step, for the rod-shaped workpiece is carried out, for example, in the following mode.

Before the quench hardening is carried out, heating conditions for the rod-shaped workpiece W are set. The heating conditions are set mainly by setting an output from the heating coil (power supply amount from the high-frequency power supply 4 to the heating coil 3) and a conveying velocity for the rod-shaped workpiece W (driving velocity of the conveying device 10) based on a practical test or a simulation using analysis software.

More specifically, first, when the rod-shaped workpiece W is conveyed through a region opposed to the second heating section 3B, the power supply amount from the high-frequency power supply 4 to the heating coil 3 is set so that the rod-shaped workpiece W can be kept at the quenching temperature for the predetermined time period, specifically, the rod-shaped workpiece W can be soaked at the quenching temperature. Subsequently, the conveying velocity for the rod-shaped workpiece W is set so that a time period required for soaking the rod-shaped workpiece W at the quenching temperature, specifically, a time period to allow a predetermined amount of carbon to be dissolved into a metallic structure of the rod-shaped workpiece W can be ensured. Finally, while the rod-shaped workpiece W, which is conveyed at the set conveying velocity, is being conveyed through a region opposed to the first heating section 3A, the coil pitch D1 of the first heating section 3A (see FIG. 2) is adjusted so that the rod-shaped workpiece W is heated to a predetermined temperature equal to or lower than the quenching temperature.

In order to heat the rod-like workpiece W to the predetermined temperature equal to or lower than the quenching temperature while the rod-shaped workpiece W is being conveyed in the region opposed to the first heating section 3A, an output from the first heating section 3A is required to be set higher than an output from the second heating section 3B. Meanwhile, in this embodiment, the high-frequency power is supplied from the single high-frequency power supply 4 to the heating coil 3. Therefore, different power supply amounts cannot be supplied respectively to the heating sections 3A and 3B, specifically, different high-frequency current amounts cannot be caused to flow respectively through the heating sections 3A and 3B. Therefore, as illustrated in FIG. 2, the coil pitch D1 of the first heating section 3A is always set smaller than the coil pitch D2 of the second heating section 3B. In this manner, the output from the first heating section 3A can be set larger than the output from the second heating section 3B so that the temperature of the rod-shaped workpiece W that is conveyed through the region opposed to the first heating section 3A can be actively increased.

Although the above-mentioned heating-condition setting operation is carried out each time the rod-shaped workpiece W to be subjected to the heat treatment is changed, the heating conditions can be stored in the controller 5 (see FIG. 1) once after being set. Specifically, the heating conditions that are set in accordance with the kind of rod-shaped workpiece W can be stored in the controller 5. In this case, even when the rod-shaped workpiece W to be subjected to the heat treatment is changed, specifically, at the time of so-called model number change, the heating conditions can be quickly set.

After the heating conditions are set, the heating coil 3 is energized. Further, after the conveying device 10 is driven, the rod-shaped workpiece W is supplied to the conveying device 10. More specifically, the rod-shaped workpiece W is fed to the conveying device 10 from a workpiece feed position illustrated in FIG. 3 so that the outer peripheral surface of the rod-shaped workpiece W is supported from the lower side in a contact state. The workpiece support portion 16 is formed by the groove bottom surface 15 of the helical groove 14, which is defined on the second shaft member 12, as described above. Therefore, while the conveying device 10 is being driven to cause both of the shaft members 11 and 12 to rotate about the axes thereof, a pressurizing force for pressurizing the rod-shaped workpiece W from one axial end side toward another axial end side is continuously applied to the rod-shaped workpiece W. As a result, the rod-shaped workpiece W is continuously conveyed at the predetermined velocity along the axial direction thereof. Then, along with the conveyance (passage) through the region opposed to the first heating section 3A, the rod-shaped workpiece W is inductively heated to the predetermined temperature equal to or lower than the quenching temperature. Subsequently, while being conveyed through the region opposed to the second heating section 3B, the rod-shaped workpiece W is kept at the quenching temperature for a predetermined time period.

The rod-shaped workpiece W, which has been inductively heated as described above and has been discharged to the outside of the heating coil 3, is fed into the cooling liquid stored in the cooling section 20 (see FIG. 1) in a free fall so as to be cooled to a temperature falling within a predetermined temperature range. As a result, the rod-shaped workpiece W is quench-hardened.

Figure 6:
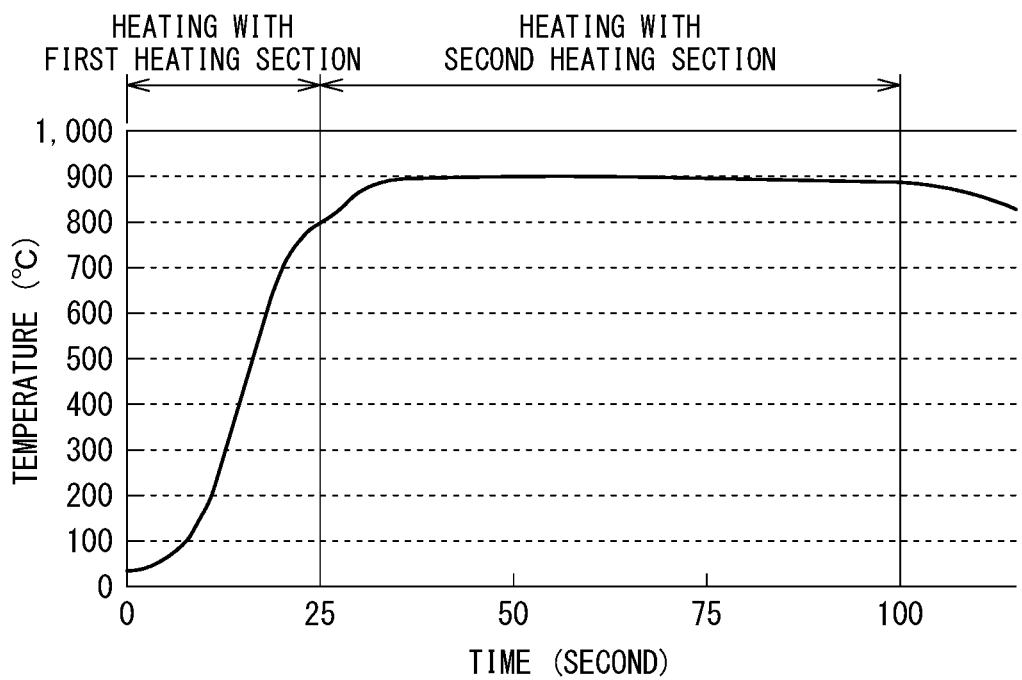
FIG. 6 is a graph for showing a temperature path of a rod-shaped workpiece when the rod-shaped workpiece is inductively heated using the heat treatment apparatus according to the present invention.
Figure 12:
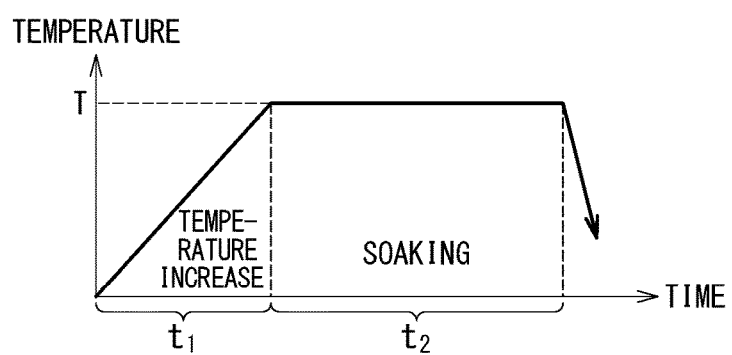
FIG. 12 is an explanatory graph for showing a desirable temperature path when the rod-shaped workpiece is heated.

When the rod-shaped workpiece W is inductively heated using the heating device 2 (heating coil 3) having the above-mentioned configuration, the rod-shaped workpiece W, which is continuously conveyed at the predetermined velocity along the axial direction, can be inductively heated by the first heating section 3A to the predetermined temperature equal to or lower than the quenching temperature and then be soaked by the second heating section 3B to the quenching temperature, specifically, the rod-shaped workpiece W can be inductively heated so that a temperature path shown in FIG. 12 is obtained. As a result, the rod-shaped workpiece W can be inductively heated to the quenching temperature in an efficient manner. In practice, for example, when the heating device 2 having the configuration described above is used for inductively heating the rod-shaped workpiece W to about 900° C. as the quenching temperature, as shown in FIG. 6, it has been verified that the rod-shaped workpiece W can be heated so that a path approximating the temperature path shown in FIG. 12 is obtained.

Further, the first heating section 3A and the second heating section 3B are coupled to each other in series to practically construct the substantially single heating coil 3. Therefore, even when there is adopted the simple configuration in which the single high-frequency power supply 4 is electrically connected to the heating coil 3, the rod-shaped workpiece W can be inductively heated in the above-mentioned mode.

When the rod-shaped workpiece W is conveyed, the first shaft member 11 and the second shaft member 12, which form the workpiece support portion 16 therebetween, are rotated in the same direction. Therefore, a rotative force for rotating the rod-shaped workpiece W about the axis thereof, specifically, in a direction opposite to the rotating direction of the shaft members 11 and 12, is continuously applied to the rod-shaped workpiece W supported in the workpiece support portion 16, as indicated by the solid arrow in FIG. 5A and FIG. 5B. Therefore, while the conveying device 10 is being driven, the pressurizing force for continuously conveying the rod-shaped workpiece W along the axial direction and the rotative force for continuously rotating the rod-shaped workpiece W about the axis thereof are simultaneously applied to the rod-shaped workpiece W, which is supported in the workpiece support portion 16 in a contact state. In other words, the rod-shaped workpiece W, which is conveyed by the conveying device 10, is inductively heated while being continuously rotated about the axis thereof. In this manner, each portion of the rod-shaped workpiece W can be inductively heated in a uniform manner without causing temperature unevenness in the rod-shaped workpiece W for which the heating has been completed. Therefore, after the rod-shaped workpiece W is cooled, the rod-shaped workpiece W of high quality, which has no difference in, for example, mechanical strength between portions in a circumferential direction, the axial direction, and a depth direction, can be obtained.

In this embodiment, in particular, the power transmission mechanism 8 is configured so that a rotation velocity of the first shaft member 11 and a rotation velocity of the second shaft member 12, which form the workpiece support portion 16, become the same. Therefore, the rod-shaped workpiece W, which is supported in the workpiece support portion 16 in a contact state, can be continuously rotated in a smooth fashion. Further, both of the shaft members 11 and 12 are formed of the non-magnetic material. Thus, cooling due to heat transfer can be prevented from occurring in contact portions between the rod-shaped workpiece W and the shaft members 11 and 12 as much as possible. Therefore, the occurrence of temperature unevenness in the rod-shaped workpiece W for which the heating has been completed can be further effectively prevented.

In the heating device 2, specifically, the heat treatment apparatus 1 according to this embodiment, the rod-shaped workpieces W are fed one by one at predetermined intervals from the workpiece feed position illustrated in FIG. 3 to the conveying device 10. As a result, the plurality of rod-shaped workpieces W can be inductively heated in a simultaneous manner while being conveyed under a state in which the plurality of rod-shaped workpieces W are separated from each other in the axial direction. In this case, each of the rod-shaped workpieces W can be heated with high accuracy without being thermally affected by the rod-shaped workpiece W adjacent thereto.

An example of the embodiment of the present invention is described above in detail, but the embodiment of the present invention is not limited to that described above.

For example, the output from the first heating section 3A having the coil pitch D1, which is included in the heating coil 3, can be set not only to heat the workpiece W to the predetermined temperature (800° C. in the illustrated example) lower than the quenching temperature (900° C. in the illustrated example) as illustrated in FIG. 6, but also to heat the rod-shaped workpiece W to about the quenching temperature.

Figure 7:
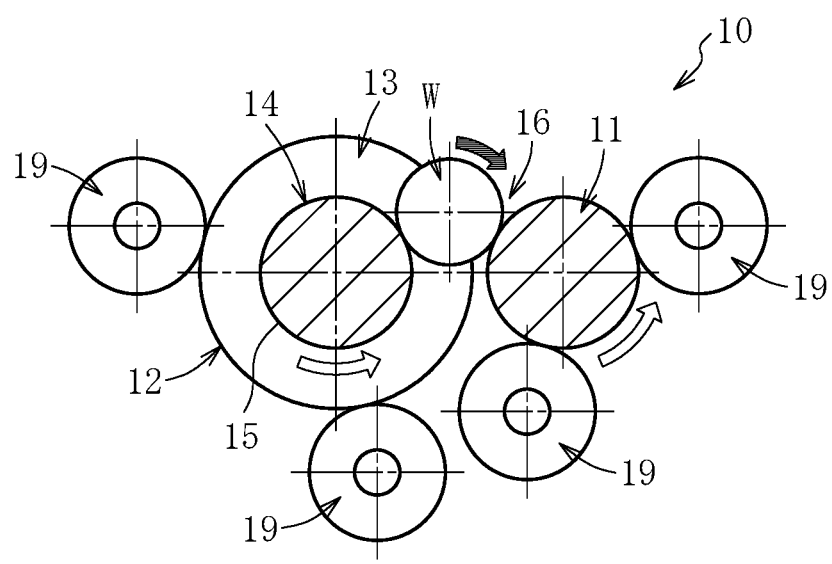
FIG. 7 is a schematic view for illustrating an example of a support mode of a first shaft member and a second shaft member of the conveying device.

Further, in particular, when there is a fear in that flexure may occur in the first shaft member 11 and the second shaft member 12, which construct the conveying device 10, support members (support rollers) 19 configured to support regions of the shaft members 11 and 12 other than regions that form the workpiece support portions 16 in a contact state may be provided as illustrated in FIG. 7. When the support rollers 19 as described above are provided, the occurrence of the flexure in the shaft members 11 and 12 can be prevented as much as possible. Thus, the rod-shaped workpiece W can be supported and conveyed with high accuracy, and hence the rod-shaped workpiece W can be inductively heated with high accuracy.

Further, in the embodiment described above, the helical protruding portion 13 is formed only on the second shaft member 12. The workpiece support portions 16 configured to support the outer peripheral surfaces of the rod-shaped workpieces W in a contact state are formed by the cooperation between the groove bottom surface 15 of the helical groove 14 defined by the protruding portion 13 on the second shaft member 12 and the cylindrical outer peripheral surface 11a of the first shaft member 11, which is opposed thereto. However, the helical protruding portions 13 may be formed on both the first shaft member 11 and the second shaft member 12 so that the workpiece support portions 16 are formed by cooperation between the groove bottom surfaces 15 of the helical grooves 14 which are respectively formed on the shaft members 11 and 12.

In the embodiment described above, the rotation velocity of the shaft member 11 about the axis thereof and the rotation velocity of the shaft member 12 about the axis thereof are set to be the same so that the rod-shaped workpiece W is continuously rotated about the axis thereof in a smooth fashion. However, the rotation velocity of the shaft member 11 and the rotation velocity of the shaft member 12 may be set different from each other as long as the rod-shaped workpiece W can be rotated about the axis thereof. In order to set the rotation velocity of the shaft member 11 and the rotation velocity of the shaft member 12 different from each other, for example, the tooth flank pitch of the small gear 8a provided to the first shaft member 11 and the large gear 8c that meshes therewith and the tooth flank pitch of the small gear 8b provided to the second shaft member 12 and the large gear 8c that meshes therewith are only required to be set different from each other.

The rotary mechanism 6 described above is merely an example, and other rotary mechanisms 6 may be adopted. For example, two electric motors may be provided so that the first shaft member 11 is coupled to an output shaft of one of the electric motors and the second shaft member 12 is coupled to an output shaft of another one of the electric motors.

The conveying device 10 described above is merely an example. When the rod-shaped workpiece W being conveyed is not required to be rotated about the axis thereof, the conveying device 10 having other configurations, for example, a conveying conveyor, may be adopted.

Figure 8:
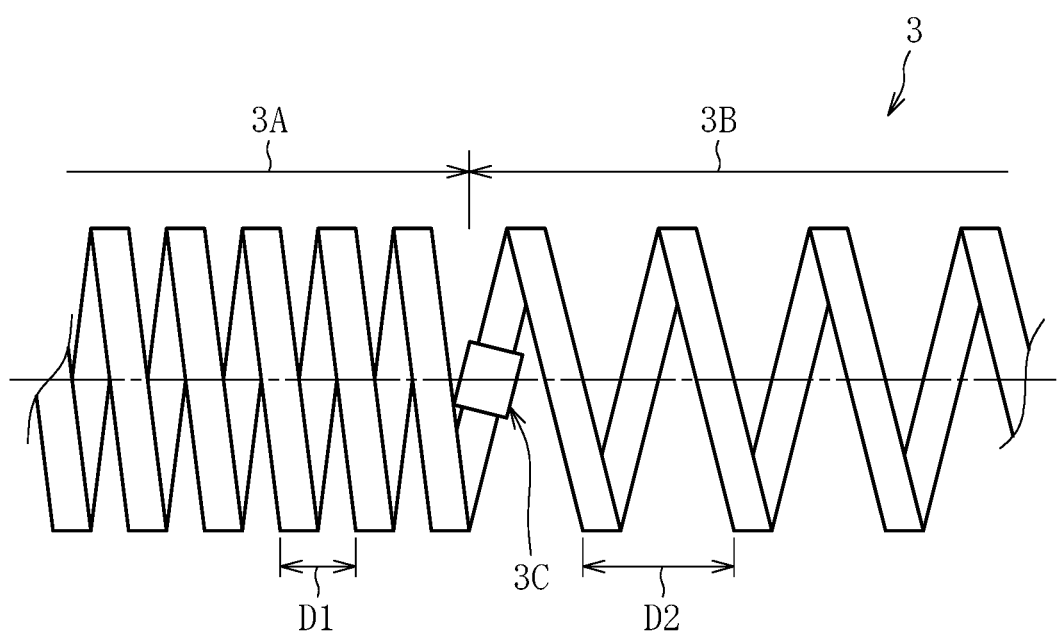
FIG. 8 is a schematic view for illustrating a modification example of a heating coil.

Further, the first heating section 3A and the second heating section 3B, which form the heating coil 3, may be separably coupled to each other. FIG. 8 is an illustration of an example thereof. An end of the first heating section 3A and an end of the second heating section 3B are fitted into a tubular coupling member 3C made of a conductive metal, which is arranged between the heating section 3A and the heating section 3B, to form the heating coil 3. In this case, for example, even when there arises the need of changing for, for example, any one or both of the coil pitches of the heating sections 3A and 3B along with change of the rod-shaped workpiece W to be subjected to the heat treatment (model number change), any one of or both of the heating sections 3A and 3B are only required to be replaced by another one having a different coil pitch. Thus, complicated coil-pitch adjustment operation can be eliminated. Therefore, arrangement operation at the time of model number change can be performed speedily.

Figure 9:
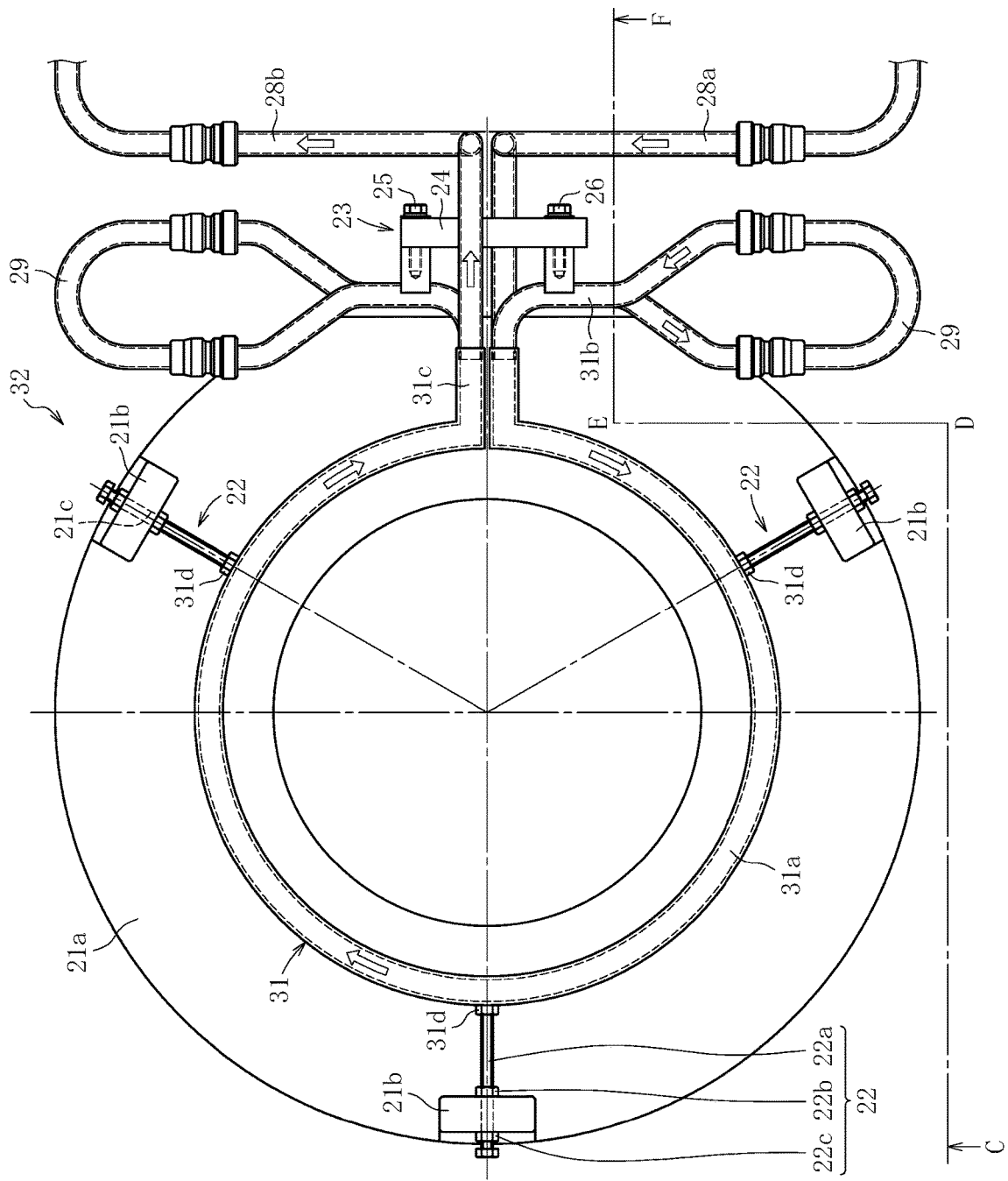
FIG. 9 is a plan view for illustrating a heating coil in another embodiment.
Figure 10:
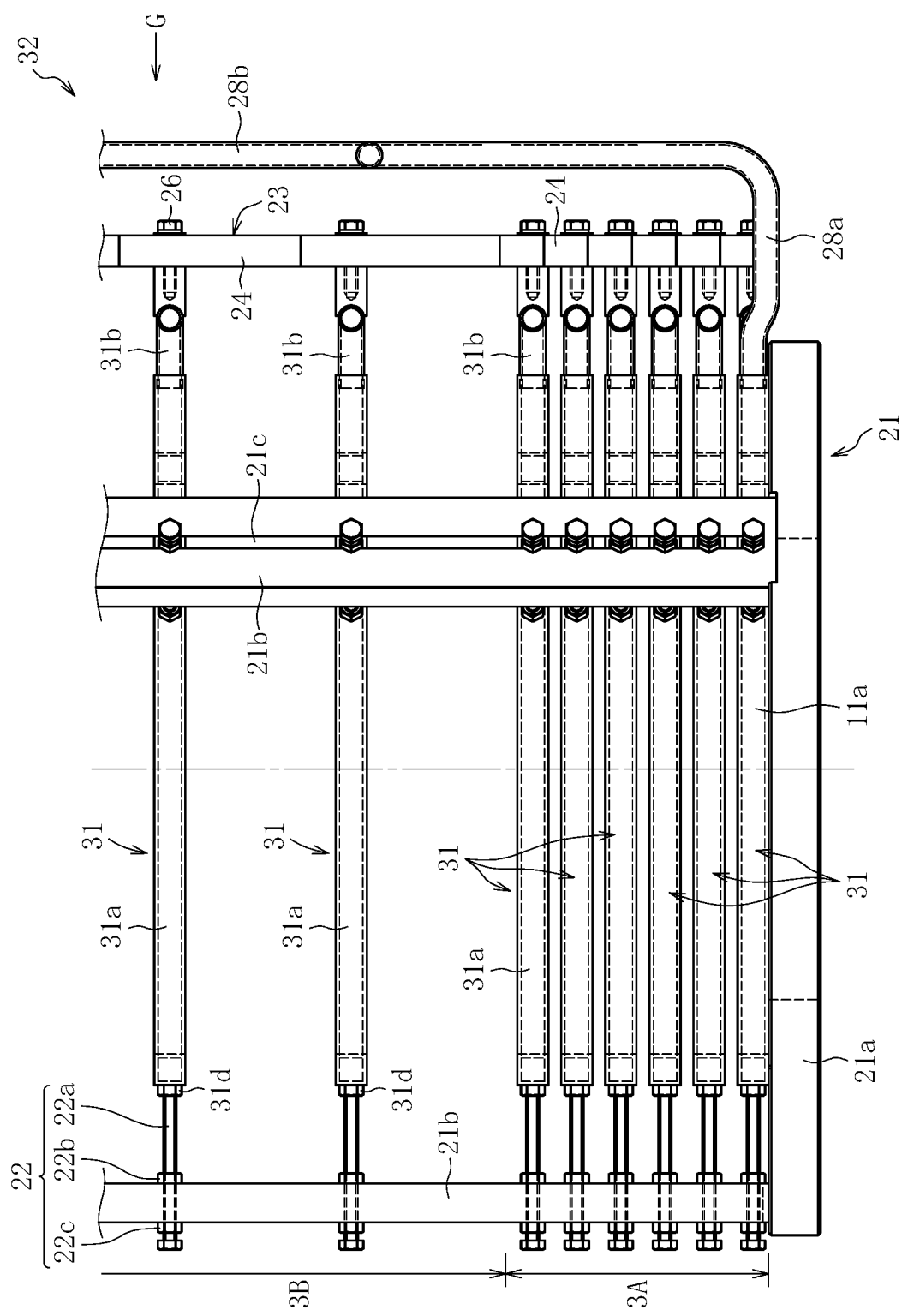
FIG. 10 is a sectional view taken along the line C-D-E-F of FIG. 9 as seen in the direction indicated by the arrows.
Figure 11:
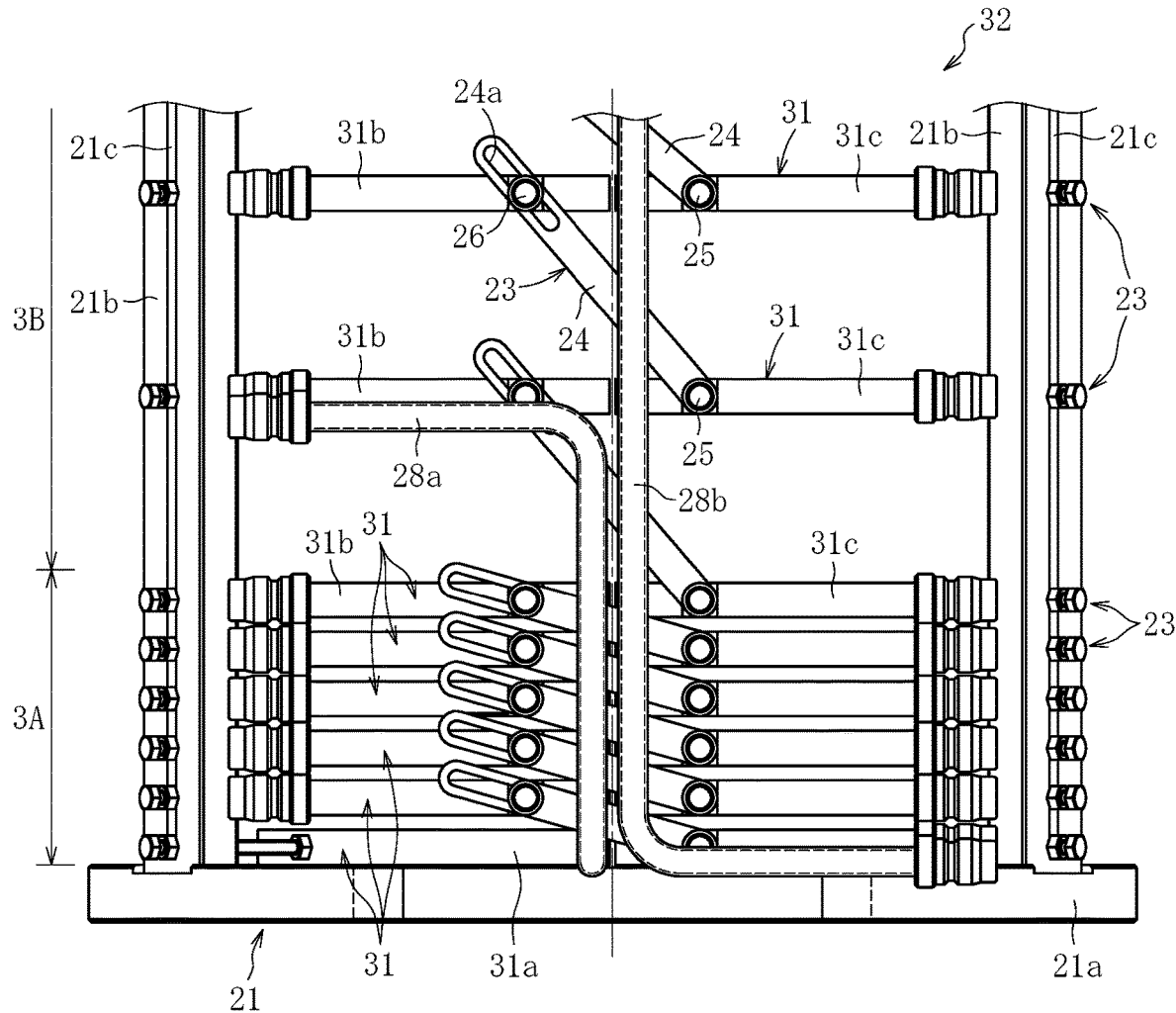
FIG. 11 is a view when

Further, as the heating coil to be provided to the heating device 2, a heating coil other than the helical coil described above can be used. A specific example thereof is described with reference to FIG. 9 to FIG. 11. FIG. 9 is a plan view of a heating coil 32 in another embodiment. FIG. 10 is a sectional view taken along the line C-D-E-F of FIG. 9 as seen in the direction indicated by the arrows. FIG. 11 is a view when FIG. 10 is seen in the direction indicated by the arrow G of FIG. 10. When the heating coil 32 is built for use in the heat treatment apparatus 1 illustrated in FIG. 1, the heating coil 32 illustrated in FIG. 10 and FIG. 11 is rotated clockwise by 90 degrees for use.

The heating coil 32 illustrated in FIG. 9 to FIG. 11 comprises a plurality of coil members 31, a frame body 21, and connecting components 23. Each of the coil members 31 has a coil portion 31a arranged on a radially outer side of the rod-shaped workpiece W being conveyed. The frame body 21 is configured to support each of the coil members 31 in an axially movable manner while maintaining coaxiality of the coil portions 31a. Each of the connecting components 23 is configured to electrically connect two adjacent ones of the coil members 31.

Further, as illustrated in FIG. 9, each of the coil members 31 comprises the coil portion 31a. The coil portion 31a is formed into a ring shape having ends in a circumferential direction so as to be capable of surrounding the rod-shaped workpiece W. Further, each of the coil members 31 has a first extending portion 31b and a second extending portion 31c respectively extending from circumferential one end and another circumferential end of the coil portion 31a, to which the connecting components 23 and communication members 29 that form a cooling circuit are mounted. Each of the coil members 31 is formed to have ends by, for example, bending a copper pipe. In the coil member 31, at least the coil portion 31a has portions in an extending direction thereof, specifically, in the circumferential direction thereof, which are positioned on the same plane. As illustrated in FIG. 10 and FIG. 11, each of the coil members 31 is supported on the frame body 21 in a state in which a center axis of the coil portion 31a is aligned with center axes of the coil portions 31a of the other coil members 31.

As illustrated in FIG. 9 to FIG. 11, the frame body 21 comprises support frames 21b and a base frame 21a. The support frames 21b are arranged at a plurality of positions (three positions in the illustrated example) apart from each other in the circumferential direction on a radially outer side of the coil members 31. Ends of the support frames 21b are fixed to the base frame 21a. Each of the coil members 31 is supported on the frame body 21 through intermediation of support components 22 fixed to the support frames 21b. Each of the support frames 21b has a guide portion 21c configured to guide movement of the coil member 31 in the axial direction. The guide portion 21c comprises an elongated through hole extending in the axial direction. The frame body 21 is made of a non-magnetic material.

Each of the support components 22 comprises a bolt member 22a, a first nut 22b, and a second nut 22c. The bolt member 22 has a radially inner end to be fastened to a nut 31d fixed to an outer periphery of the coil member 31, and a radially outer end at a vicinity thereof to be inserted into the guide portion 21c of the support frame 21b. The first nut 22b is arranged on a radially inner side of the support frame 21b. The second nut 22c is arranged on a radially outer side of the support frame 21b. The first nut 22b and the second nut 22c are screwed on the bolt member 22a so as to be capable of moving closer and away relative to each other. With the configuration described above, when the nuts 22b and 22c are moved closer relative to each other in each of the support components 22 provided at the three positions in the circumferential direction to sandwich the support frame 21b therebetween, each of the coil members 31 is fixedly supported at a predetermined position in the axial direction. In contrast, when the nuts 22b and 22c are moved away relative to each other in each of the support components 22 to release a force of sandwiching the support frame 21b, the movement of the coil member 31 in the axial direction, specifically, a fixed position and a posture of the coil member 31 in the axial direction can be adjusted.

The heating coil 32 comprises the connecting components 23, which are configured to electrically connect the two coil members 31 that are adjacent to each other. Hence, the coil member 31 that is arranged on one axial side and the coil member 31 that is arranged on another axial side are electrically connected to the high-frequency power source 4 (see FIG. 1). For description of the two coil members 31 that are adjacent to each other, the coil member 31 that is arranged relatively on a front side in the conveying direction for the rod-shaped workpiece W, specifically, on the upper side in FIG. 11, is also referred to as "coil member 31A", and the coil member 31 that is arranged relatively on a rear side in the conveying direction for the rod-shaped workpiece W, specifically, on the lower side in FIG. 11, is also referred to as "coil member 31B" for convenience. In FIG. 9 to FIG. 11, the coil members are not discriminably indicated by the reference symbols 31A and 31B.

As illustrated in detail in FIG. 11, each of the connecting components 23 comprises a link member 24, a first coupling member 25, and a second coupling member 26. The link member 24 has a linear shape. The first coupling member 25 couples one end of the link member 24 to the second extending portion 31c of the coil member 31B so that the one end is rotatable relative to the second extending portion 31c. The second coupling member 26 couples another end of the link member 24 to the first extending portion 31b of the coil member 31A so that the another end is slidable and rotatable relative to the first extending portion 31b. At least the link member 24 of the connecting component 23 is made of a metal material (metal rigid member) having conductivity. The link member 24 is held in direct contact with the coil members 31 (31A, 31B). Therefore, the two coil members 31A and 31B that are adjacent to each other are connected not only electrically but also mechanically through intermediation of the connecting components 23. A through hole 24a having an elongated hole shape is formed in another end of the link member 24. The second coupling member 26 is fastened to the coil member 31A through the through hole 24a. In this manner, the link member 24 is slidable and rotatable relative to the coil member 31A. Therefore, a separation distance (coil pitch) between the two coil members 31A and 31B that are adjacent to each other can be adjusted in a stepless manner within a range of a longitudinal dimension of the through hole 24a. Therefore, the coil-pitch adjustment operation can be appropriately and efficiently carried out.

The heating coil 32 can comprise the cooling circuit, which is configured to cool the coil members 31. The cooling circuit is formed by connecting a water supply pipe 28a to a free end of the coil member 31 that is arranged at the rear end in the conveying direction for the rod-shaped workpiece W, connecting a water discharge pipe 28b to a free end of the coil member 31 that is arranged at the front end in the conveying direction for the rod-shaped workpiece W, and bringing an internal space of the coil member 31A and and an internal space of the coil member 31B, which are two coil members adjacent to each other, into communication with each other through a communication member 29. The communication member 29 is formed of a tubular member made of a flexible material, which is a rubber material in this embodiment, and has one end connected to an open end of the coil member 31A and another end connected to an open end of the coil member 31B. The formation of the communication member 29 made of the flexible material allows the adjustment of the coil pitch without cancelling a connecting state between the communication member 29 and the coil members 31A and 31B. For preventing complication of illustration, the communication members 29 are illustrated only in FIG. 9.

A flow of cooling water is now described briefly with reference to FIG. 9. The cooling water supplied from a water storage tank (not shown) flows into the internal space of the coil member 31 arranged at the rear end in the conveying direction for the rod-shaped workpiece W through the water supply pipe 28a and then circulate alternately through internal spaces of the communication members 29 and the internal spaces of the coil members 31, as indicated by the outlined arrows illustrated in FIG. 9. Then, the cooling water, which has circulated through the internal space of the coil member 31 arranged at the front end in the conveying direction for the rod-shaped workpiece W, is discharged to the outside through the water discharge pipe 28b.

The heating coil 32 of this embodiment mainly has the configuration described above. For practical use, the separation distance (coil pitch) between the coil members 31A and 31B that are two coil members adjacent to each other is suitably adjusted. More specifically, as illustrated in FIG. 10 and FIG. 11, the separation distance between the plurality of coil members 31 arranged on the rear side in the conveying direction for the rod-shaped workpiece W is set relatively small, whereas the separation distance between the plurality of coil members 31 arranged on the front side in the conveying direction for the rod-shaped workpiece W is set relatively large. Through the setting described above, as illustrated in FIG. 10 and FIG. 11, in the heating coil 32, the first heating section 3A capable of actively heating the rod-shaped workpiece W and the second heating section 3B capable of soaking the rod-shaped workpiece W are formed.

As described above, through use of the heating coil 32 described above, in comparison to a case in which the heating coil 3 formed of the helical coil illustrated in FIG. 2 and other drawings, the coil pitch can be easily adjusted. Therefore, the model number change of the rod-shaped workpiece W and other changes can be easily dealt with.

Although the tapered roller, specifically, a base material thereof has been exemplified as the rod-shaped workpiece W in the description given above, the present invention can be suitably applied to a case in which the heat treatment is performed on other rod-shaped workpieces W including the cylindrical roller for the cylindrical roller bearing and the needle roller for the needle roller bearing. Further, the present invention can be suitably applied to a case in which not only the solid rod-shaped workpiece W such as various rollers described above but also the hollow rod-shaped workpiece W is inductively heated.

The present invention is not limited to the above-mentioned embodiments. The present invention may be carried out in various modes without departing from the spirit of the present invention. The scope of the present invention is defined in claims, and encompasses equivalents described in claims and all changes within the scope of claims.

REFERENCE SIGNS LIST 1 heat treatment apparatus
2 heating device
3 heating coil
3A first heating section
3B second heating section
4 high-frequency power supply
6 rotary mechanism
8 power transmission mechanism
10 conveying device
11 first shaft member 12 second shaft member
13 helical protruding portion
14 helical groove
15 groove bottom surface
20 cooling section (cooling device)
D1 coil pitch of first heating section
D2 coil pitch of second heating section
W rod-shaped workpiece

The invention claimed is:

1. A heat treatment method, comprising a heating step of inductively heating a rod-shaped workpiece having an outer peripheral surface with a circular cross section to a quenching temperature by causing the rod-shaped workpiece to pass through a region opposed to a heating coil in an energized state while continuously conveying the rod-shaped workpiece at a predetermined velocity along an axial direction of the rod-shaped workpiece, wherein, in the heating step,
by conveying a plurality of the rod-shaped workpieces while each of the rod-shaped workpieces is being rotated about an axis thereof, and under a state in which the plurality of rod-shaped workpieces are separated from each other in the axial direction of the rod-shaped workpieces, and
by using the heating coil,
which is electrically connected to a single high-frequency power supply,
which comprises a first heating section, which inductively heats the rod-shaped workpieces to a predetermined temperature equal to or lower than the quenching temperature, and a second heating section, which keeps the rod-shaped workpieces at the quenching temperature, the first heating section and the second heating section being coupled to each other in series in the axial direction of the rod-shaped workpieces, and
in which a coil pitch of the second heating section arranged relatively on an upstream side in a conveying direction of the rod-shaped workpieces is larger than a coil pitch of the first heating section arranged relatively on a downstream side in the conveying direction for the rod-shaped workpieces,
each portion of the rod-shaped workpieces is inductively heated in a uniform manner, and each of the rod-shaped workpieces is inductively heated so that a predetermined temperature path is obtained.

2. The heat treatment method according to claim 1, wherein an axial dimension of the second heating section is longer than an axial dimension of the first heating section.

3. The heat treatment method according to claim 1, wherein the first heating section and the second heating section are separably coupled to each other.

4. The heat treatment method according to claim 1,
wherein the conveying of the plurality of rod-shaped workpieces is performed with a conveying device comprising:
a first shaft member and a second shaft member, which are apart from each other, extend in parallel in the axial direction, and are configured to support the outer peripheral surfaces of the rod-shaped workpieces in a contact state in cooperation with each other; and
a rotary mechanism configured to rotate the first shaft member about an axis thereof and the second shaft member about an axis thereof in a same direction,
wherein at least one of the first shaft member and the second shaft member comprises a helical protruding portion extending along an outer periphery thereof, and the outer peripheral surfaces of the rod-shaped workpieces are held in contact with a groove bottom surface of a helical groove defined by the helical protruding portion.

5. The heat treatment method according to claim 4, wherein one of the first shaft member and the second shaft member is formed of a threaded shaft having the helical protruding portion, and another of the first shaft member and the second shaft member is formed of a columnar shaft having a constant diameter.

6. The heat treatment method according to claim 1, further comprising a cooling step of cooling the rod-shaped workpieces heated to the quenching temperature in the heating step,
wherein, in the cooling step, each of the rod-shaped workpieces discharged to an outside of the heating coil is fed into a cooling liquid stored in a cooling liquid bath.

7. The heat treatment method according to claim 1, wherein the rod-shaped workpieces are made of a steel material containing carbon at 0.8% by mass or more.

8. The heat treatment method according to claim 1, wherein the rod-shaped workpieces each comprise a roller which forms a roller bearing.

* * * * *